(12) United States Patent
McClelland et al.

(10) Patent No.: US 10,355,542 B2
(45) Date of Patent: Jul. 16, 2019

(54) ROTARY ELECTRIC MACHINE

(71) Applicant: MOTEURS LEROY SOMER, Angouleme (FR)

(72) Inventors: Michael McClelland, Champniers (FR); Ioan Deac, Cluj Napoca (RO); Aurélien Courage, Givors (FR); Alexis Dutau, Saint-Yrieix sur Charente (FR)

(73) Assignee: Moteurs Leroy Somer, Angouleme (FR)

( * ) Notice: Subject to any disclaimer, the term of this patent is extended or adjusted under 35 U.S.C. 154(b) by 226 days.

(21) Appl. No.: 15/192,239

(22) Filed: Jun. 24, 2016

(65) Prior Publication Data

US 2016/0380490 A1 Dec. 29, 2016

(30) Foreign Application Priority Data

Jun. 26, 2015 (FR) ...................................... 15 55985

(51) Int. Cl.
*H02K 1/20* (2006.01)
*H02K 5/15* (2006.01)
(Continued)

(52) U.S. Cl.
CPC ................ *H02K 1/20* (2013.01); *H02K 1/16* (2013.01); *H02K 1/185* (2013.01); *H02K 5/00* (2013.01);
(Continued)

(58) Field of Classification Search
CPC ............... H02K 1/20; H02K 5/15; H02K 9/06
(Continued)

(56) References Cited

U.S. PATENT DOCUMENTS 1,882,487 A * 10/1932 Dupont ................... H02K 1/16
310/216.011
2,818,515 A * 12/1957 Dolenc .................. H02K 1/185
310/216.014
(Continued)

FOREIGN PATENT DOCUMENTS

DE 102012017293 * 2/2014 ............... H02K 5/20
FR 2927736 A1 8/2009
(Continued)

OTHER PUBLICATIONS

French Search Report with opinion for FR1555985 dated Apr. 18, 2016.

*Primary Examiner* — Burton S Mullins
(74) *Attorney, Agent, or Firm* — Cooper Legal Group, LLC; Ronald M. Kachmarik (57) ABSTRACT

The invention relates to an electric machine comprising a stator, this stator comprising a set (10) of magnetic laminations which is made up of at least one first subset (50) and of at least one second subset (60) adjacent to the first the laminations of the first and second subsets having parts which become superposed, each comprising at least one closed channel formed within the laminations, the laminations being identical but angularly offset from one another by an angle 360°/n about the axis of the machine, where n is a non-zero integer, the laminations being without symmetry in a rotation by 360°/n so that the parts of the laminations thus offset which become superposed are non-identical and create the said perturbation in the flow at the transition between the channels of the first and second subsets.

21 Claims, 5 Drawing Sheets

(51) Int. Cl.
*H02K 9/06* (2006.01)
*H02K 1/18* (2006.01)
*H02K 5/00* (2006.01)
*H02K 5/04* (2006.01)
*H02K 7/14* (2006.01)
*H02K 1/16* (2006.01)
*H02K 5/22* (2006.01)

(52) U.S. Cl.
CPC ................ *H02K 5/04* (2013.01); *H02K 7/14* (2013.01); *H02K 9/06* (2013.01); *H02K 5/225* (2013.01); *H02K 2201/06* (2013.01)

(58) Field of Classification Search
USPC .................................................. 310/216.119
See application file for complete search history.

(56) References Cited

U.S. PATENT DOCUMENTS

| | | | | |
|---|---|---|---|---|
| 3,671,790 A | * | 6/1972 | Widstrand | H02K 1/16 310/216.055 |
| 3,784,851 A | * | 1/1974 | Fujii | H02K 1/20 310/58 |
| 4,912,350 A | | 3/1990 | Parshall et al. | |
| 5,173,629 A | * | 12/1992 | Peters | H02K 1/16 310/216.014 |
| 5,331,238 A | * | 7/1994 | Johnsen | H02K 1/185 310/216.049 |
| 5,747,900 A | * | 5/1998 | Nakamura | H02K 9/14 310/58 |
| 5,859,483 A | * | 1/1999 | Kliman | H02K 1/20 310/216.004 |
| 7,573,165 B2 | | 8/2009 | Cook | |
| 7,633,194 B2 | | 12/2009 | Dawsey et al. | |
| 7,808,136 B2 | * | 10/2010 | Knauff | H02K 1/20 310/215 |
| 8,427,018 B2 | * | 4/2013 | Dutau | H02K 1/20 310/52 |
| 8,519,580 B2 | * | 8/2013 | Brandl | H02K 9/16 310/57 |
| 9,419,479 B2 | * | 8/2016 | Shoykhet | H02K 1/20 |
| 9,680,351 B2 | * | 6/2017 | Boxberg | H02K 9/02 |
| 2005/0067905 A1 | | 3/2005 | Maney | |
| 2007/0013241 A1 | | 1/2007 | Schiferl et al. | |
| 2007/0159018 A1 | * | 7/2007 | Martin | H02K 5/136 310/88 |
| 2010/0207465 A1 | | 8/2010 | Dutau et al. | |
| 2012/0080983 A1 | * | 4/2012 | Iund | H02K 1/20 310/60 A |

FOREIGN PATENT DOCUMENTS

| | | | | |
|---|---|---|---|---|
| FR | 3045235 | * | 12/2015 | ............... H02K 5/18 |
| GB | 453038 | * | 9/1936 | ............... H02K 9/14 |
| JP | 2013162608 A | | 8/2013 | |
| WO | WO2005027718 A1 | | 3/2005 | |
| WO | WO2007002216 A1 | | 1/2007 | |

* cited by examiner

ROTARY ELECTRIC MACHINE

The present invention relates to rotary electric machines comprising at the stator a set of magnetic laminations.

The laminations conventionally form slots accepting the turns of the stator windings of the machine.

In order to make it easier to cool the machine, it is known practice to form the laminations with cooling channels or fins.

Moreover, the machines can be categorized into two families: namely machines with a frame and frameless machines.

In the first category, the set of stator laminations is housed in a frame. In the second, the set of laminations directly defines the exterior surface of the machine.

Application FR 2 927 736 and U.S. Pat. Nos. 5,331,238 and 7,633,194 disclose framed machines. The set of stator laminations may comprise subsets provided with fins, which are arranged in a staggered configuration along the machine, so as to create turbulence and increase the effectiveness of the cooling.

Frameless machines are known from publications WO 2007/002216, U.S. Pat. No. 8,519,580, US 2005/0067905 and WO 2005/022718.

These machines usually employ laminations of square overall shape.

In WO 2007/002216, the set of stator laminations is produced with fins. In U.S. Pat. No. 8,519,580, the set of laminations is produced with internal channels.

The frame represents a relatively high cost and creates an additional thermal barrier to the outside. However, it is necessary in certain machines in order to close the cooling-fluid channels.

A frameless machine may prove less expensive to manufacture although the sharp edges resulting from the cutting of the fins on the outside of the set of laminations may cause injuries when the stator is being handled.

The invention seeks to overcome at least some of the disadvantages of the known machines and to improve electric machines still further, and achieves this objective by virtue of an electric machine comprising a stator, this stator comprising a set of magnetic laminations which is made up of at least one first subset and of at least one second subset adjacent to the first the laminations of the first and second subsets having parts which become superposed, each comprising at least one closed channel formed within the laminations, these channels communicating with one another at the transition between the subsets, the parts of the laminations that become superposed being nonidentical so as to create a perturbation in the flow within the channels at the transition between the channels of the first and second subsets.

In preferred exemplary embodiments of the invention, the laminations of the first and second subsets have parts which become superposed, each comprising at least one closed channel formed within the laminations, the laminations being identical but angularly offset from one another by an angle 360°/n about the axis of the machine, where n is a non-zero integer, the laminations being without symmetry in a rotation by 360°/n so that the parts of the laminations thus offset which become superposed are nonidentical and create the said perturbation in the flow at the transition between the channels of the first and second subsets.

The invention makes it possible to create a frameless machine without the disadvantages of the known frameless machines and with the possibility of better cooling.

In particular, the perturbation of the flow within the channels at the transition between the subsets makes it possible to increase the exchange of heat between the set of laminations and the cooling fluid as compared with a straight passage which induces only a very small amount of turbulence.

Cooling is thus improved in comparison with a frameless machine the channels of which are straight because of the use of identical laminations superposed in order to create them.

In addition, the invention makes it possible to reduce, if not eliminate, because the channels are closed, the presence of sharp edges on the exterior surface of the casing, thus improving safety in instances where there is no frame; the invention is not, however, limited to a frameless machine, and a casing may be provided around the set of laminations; this casing may differ from a cast frame as used in the machines of the prior art and may simply be a metal sheet wound around the set of laminations. This casing may be used to customize the machine, by being any colour and/or by bearing any desired decorative effect, for example a logo.

The machine may be a sealed machine with an IP 55 rating or open machine with an IP 23 rating.

The invention allows improved cooling and also makes it possible, if desired, to use channels of shapes that are not well suited to mounting inside a frame, unlike in the prior art; the invention makes it possible to avoid the need to create complicated castings.

At least one channel has, in cross section over at least part of its length, a closed contour within the set; for preference, the same is true of all the channels, or at the very least most of them. When the channels are closed over at least part of their length, the presence of an additional component such as a frame in order to force the cooling fluid to circulate inside them is no longer needed, unlike in the prior art.

A "closed channel" is to be understood as meaning that the channel is not opened radially to the outside over at least part of its length. This closure may be achieved by virtue of a wall produced during the cutting of the laminations. This wall may define at least part of the exterior surface of the set of stator laminations.

For preference, the exterior contour of the laminations is non-circular and each lamination has angular extensions, preferably n in number, through which the said channels pass.

The laminations may be without symmetry with respect to each of two mutually perpendicular planes containing the axis of the machine, while having extensions that are symmetric with respect to the axis of the machine.

At least two channels may be separated within each angular extension by partitions, preferably oriented radially, or being parallel to a midplane, notably a radial midplane.

The laminations may have a contour that is generally polygonal, notably square. n is preferably equal to 4, although other values are possible.

The machine may comprise an alternation of at least four subsets, with a rotation from one subset to the other, notably by 90°.

The laminations may comprise at least one exterior identification slot to make it possible to check the orientation of each subset within the set.

The laminations may be produced in such a way that, at the transition between two subsets, at least one partition separating two adjacent channels of one subset becomes superposed nonexactly with a corresponding partition of the other subset so as to create a discontinuity at the interface, in a channel adjacent to the partitions which are superposed.

The offset between the partitions which creates this discontinuity may be of greater or lesser magnitude and preferably represents at least 1 mm. In an alternative, at least one of the partitions of a subset is positioned between two partitions of the adjacent subset so that a channel passing through one subset opens into two channels of the adjacent sub set.

The perturbations to the flow may be obtained by the arrangement of the partitions that separate the channels, as mentioned hereinabove; as an alternative or in addition, these perturbations are obtained by altering the radial position of the edge of the annular part of the laminations that delimit the channels radially towards the inside. In yet another alternative form, the perturbations are created by altering the position of walls that externally close the channels; that may make it possible to create discontinuities disrupting the flow both within the channels and on the outside of the set of laminations, along same.

Each extension may comprise a central part and, on each side of this central part, spaced-apart partitions connected at their base to the annular central part of the lamination and connected at their periphery to the outer wall which closes the channels. The latter may extend in the continuation of the sides of the lamination.

Each subset comprises for example between 35 and 140 laminations. For preference within the set, the laminations are all identical, give or take the rotation between the subsets. Each lamination may be monolithic or made up of assembled sectors.

The set of laminations may comprise holes opening laterally via a passage towards the outside, through-bolts being engaged in these holes and welded to the laminations via the said passages, the holes preferably being situated in the said extensions and, better still, the central parts thereof.

The machine may have no casing. As an alternative, it does have a casing at least partly covering the set of laminations, notably a sheet metal casing.

Such a casing may act as trim and guide the cooling fluid over the outside of the set of laminations, thus improving the effectiveness of the cooling still further.

The machine may or may not be mounted cantilever-fashion on a member that is to be driven or that drives it, notably an air compressor, as divulged notably in U.S. Pat. No. 7,573,165.

The machine may comprise a front flange adjacent to the member that is to be driven or that drives it, provided with support feet, and a rear flange that has no support feet.

As an alternative, the machine comprises front and rear flanges each provided with support feet.

The cooling of the machine may be performed using a fan driven by the shaft of the machine or using an independent motor-driven fan attached to the set of laminations or to a flange of the machine.

The invention will be better understood from reading the detailed description that follows of some nonlimiting exemplary embodiments thereof and from studying the attached drawing in which.

Figures 10, 12:
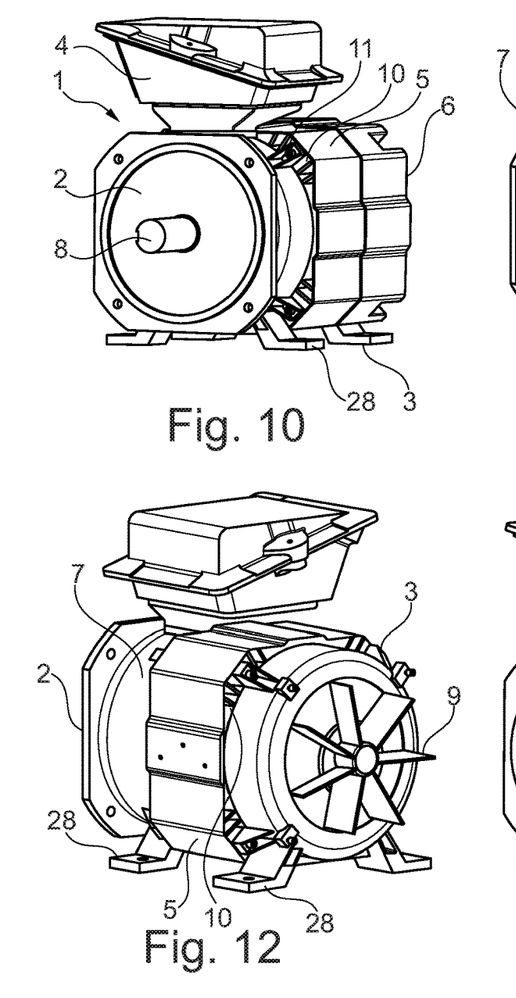
FIGS. 10 to 13 depict examples of machines according to the invention.
Figures 11, 13:
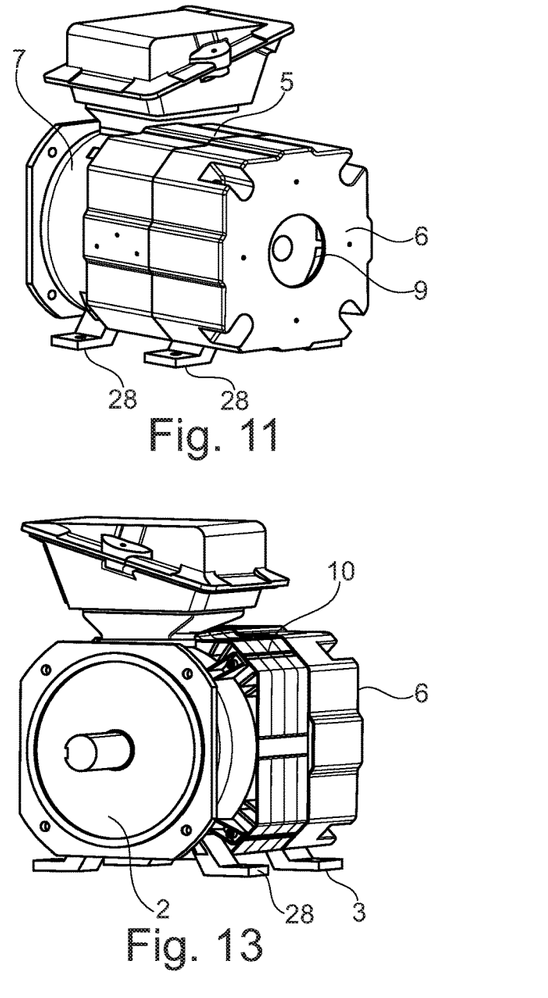

FIGS. 1 to 4 depict one example of a set of stator laminations 10 of a rotary electric machine according to the invention. This may be a synchronous or asynchronous permanent-magnet or otherwise alternator or motor. An example of a complete machine 1 is depicted in FIGS. 10 to 12.

Figure 5:
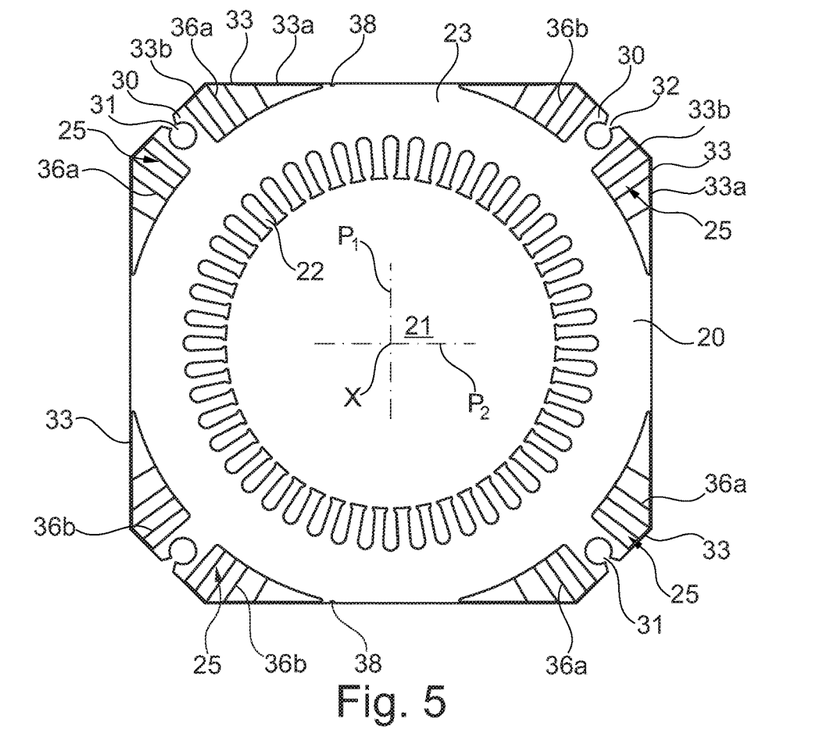
FIG. 5 depicts one lamination in isolation.

The set 10 comprises a collection of superposed magnetic laminations 20 one of which is depicted in isolation in a front view in FIG. 5.

Each lamination 20 is made for example of magnetic steel covered by an electrically insulating varnish on its opposing faces, in the way known per se.

In the example considered, the machine has an interior rotor and each lamination 20 comprises a central opening 21 for the passage of the rotor, into which opening open slots 22 cut into the lamination and intended to accept the electrical conductors of the stator windings.

The lamination 20 has a continuous annular part 23 behind the slots and extensions 25 in the four corners, the exterior contour being generally square in shape with cut-off corners at the extensions 25.

The extensions 25 each have, as may be seen notably from FIG. 5, a central part 30 through which there passes a hole 31 open radially to the outside at a passage 32, exterior walls 33 defining the exterior contour of the extension 25 on each side of the central part 30, and partitions 36a and 36b connecting each exterior wall 33 to the annular part 23. The set of stator laminations is assembled by inserting four steel through-bolts 11 into the holes 31, which are then welded all along the passage 32.

The partitions 36a are situated at the level of two diametrically opposite extensions 25, and the partitions 36b at the level of the other two extensions 25. The partitions 36a and 36b are not symmetric with respect to one another about planes P1 and P2 containing the axis X and perpendicular to one another and to the sides of the set of laminations.

Because the partitions 36 and 36b are not symmetric, there is an offset between them when two laminations 20 are superposed with a 90° offset between them. The laminations 20 superpose with one another exactly when this offset is increased to 180°.

Each exterior wall 33 has a first portion 33a that extends in the continuation of a corresponding side of the lamination between the extensions 25 and a second portion 33b which forms an elbow with the first 33a and defines the cut-off edge of the corner of the lamination.

Identification slots 38 are produced on the two opposite sides of each lamination 20 so as to provide information as to the orientation thereof within the set. These slots 38 are symmetric with one another about the plane P2.

The lamination 20 is preferably produced monolithically by being cut from strip in its definitive shape, but as an alternative, the set 10 is formed by rolling up a string of sectors or by assembling sectors (each constituting ¼ or ⅛ of a complete lamination) in the case of very large machines. For this type of electrical machine the use of segmented laminations is advantageous.

The through-bolts 11 may potentially be used to assemble the set 10 with the front and rear flanges of the machine.

The laminations 20 may also be assembled with one another by stapling, in a way known per se.

Figure 1:
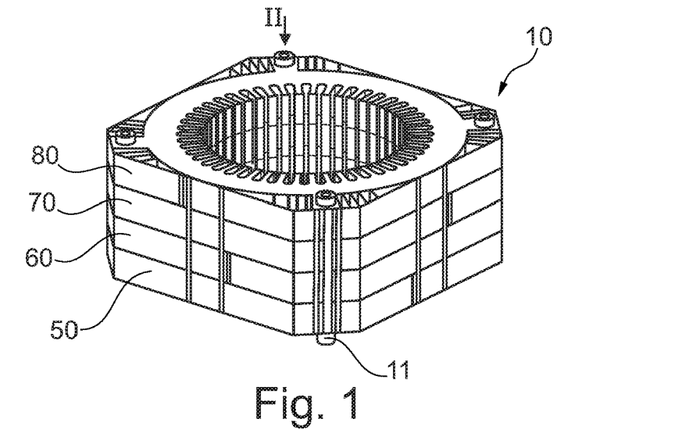
FIG. 1 is a schematic perspective depiction of a set of laminations according to the invention.
Figure 2:
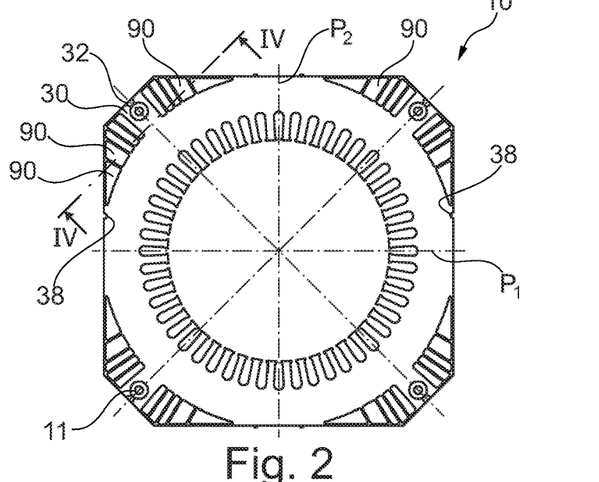
FIG. 2 is a front view of the set of laminations of FIG. 1.
Figure 3:
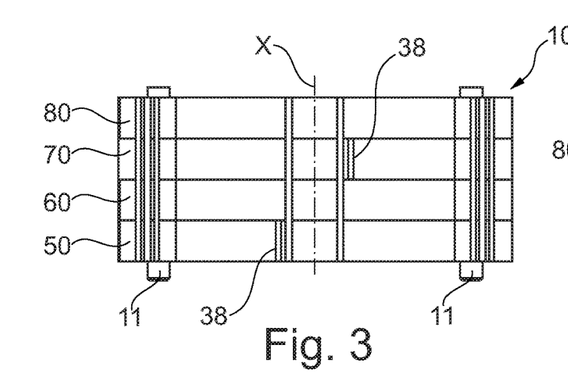
FIG. 3 is a side view of the set.
Figure 4:
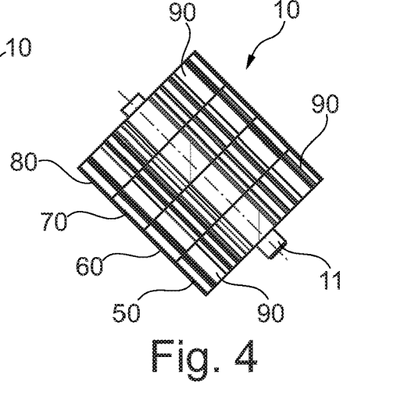
FIG. 4 is a cross section of an extension of the set of laminations on IV-IV of FIG. 2.

According to the invention, the set 10 is formed with subsets 50, 60, 70 and 80 which follow on from one another along the axis X of the stator.

These subsets 50 to 80 are each formed of a plurality of superposed identical laminations 20. The subsets 50 to 80 differ from one another in terms of the orientation of the laminations 20 from one subset to the other; within each subset, the orientation of the laminations is the same.

More particularly, in the example considered, the laminations 20 are arranged from one subset to the other with a rotation of 90° about the axis X. Thus, between two consecutive subsets, the partitions 36a become partially superposed with partitions 36b, as visible in FIG. 6.

Figure 6:
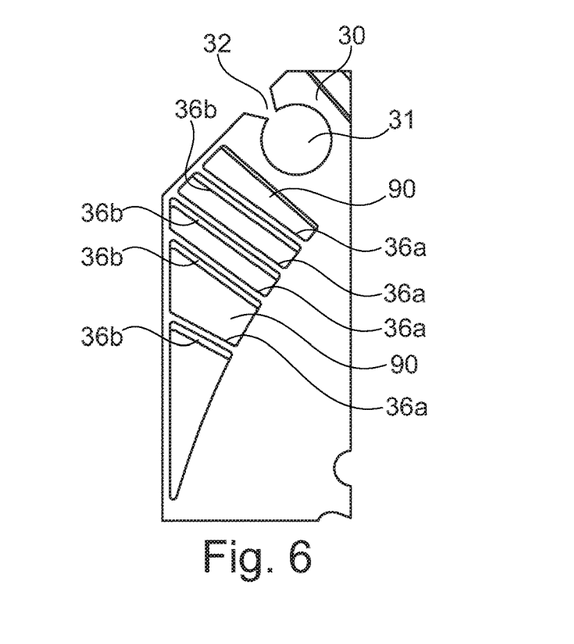
FIG. 6 depicts a detail of FIG. 2.

The partitions 36a and 36b delimit within each subset channels 90 through which a fluid contributing to the cooling of the stator, for example air, can circulate.

The offset between the partitions 36a and 36b at the interface between the subsets forms a discontinuity of the interior surface of the channels 90 which tends to perturb the flow of the cooling of fluid within it, rendering this flow more turbulent. This results in an improved exchange of heat between the fluid and the set of laminations and in better cooling of the machine.

In the example of FIGS. 1 to 6, the exterior walls 33 are symmetric with respect to the planes P1 and P2, such that the succession of subsets does not create any discontinuities on the exterior surface of the stator.

Figure 7:
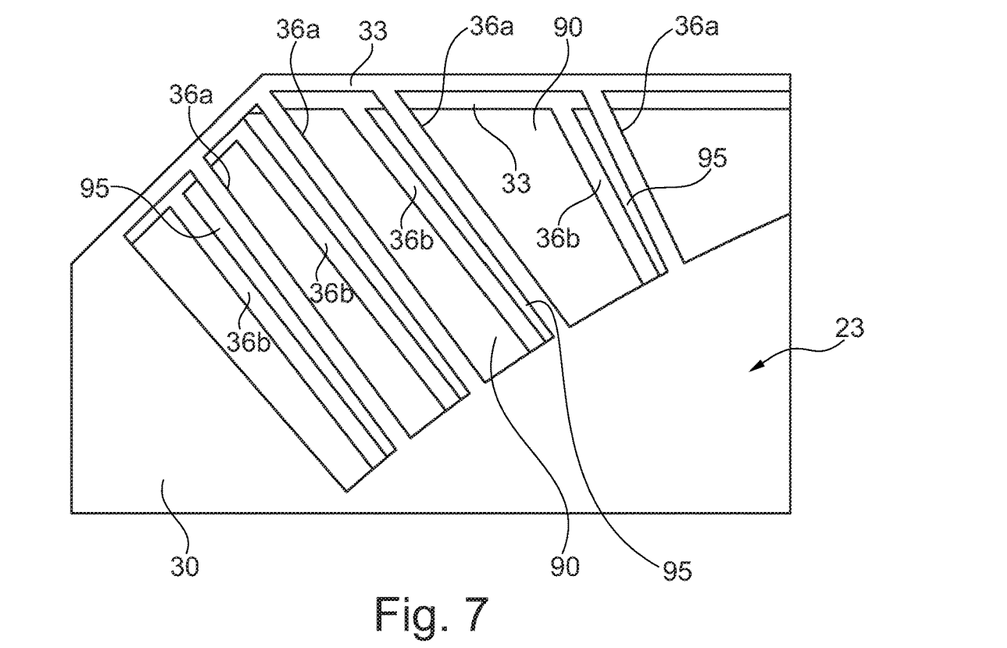
FIG. 7 is a view similar to FIG. 6 of an alternative form of embodiment.

In the alternative form of FIG. 7, the offset between the partitions 36a and 36b is more pronounced, which means that the partitions 36a and 36b do not become superposed within the set but in projection along the axis X, create intermediate passages 95. The offset between the partitions 36a and 36b as in the example of FIGS. 1 to 6 induces turbulence in the passage of the cooling fluid through the extensions.

The example of FIG. 7 also illustrates the option of offsetting the exterior walls 33 from one subset to another; the extensions 25 are then produced with asymmetry not only in terms of the partitions 36a and 36b but also in terms of the exterior walls 33.

Figure 8:
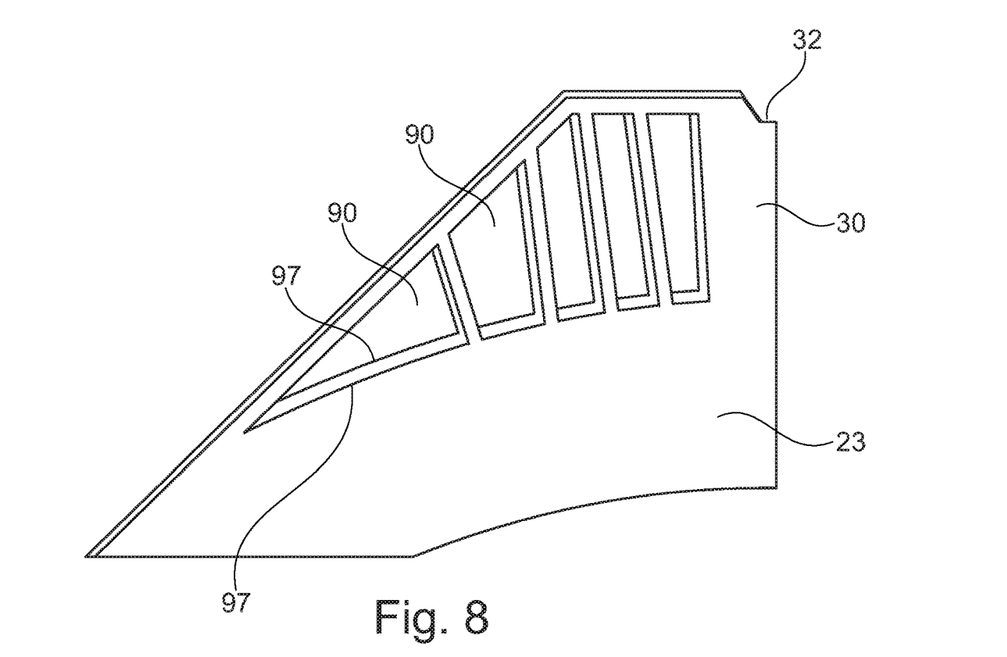
FIG. 8 is a schematic perspective depiction of the arrangement of the laminations in the example of FIG. 7.
Figure 9:
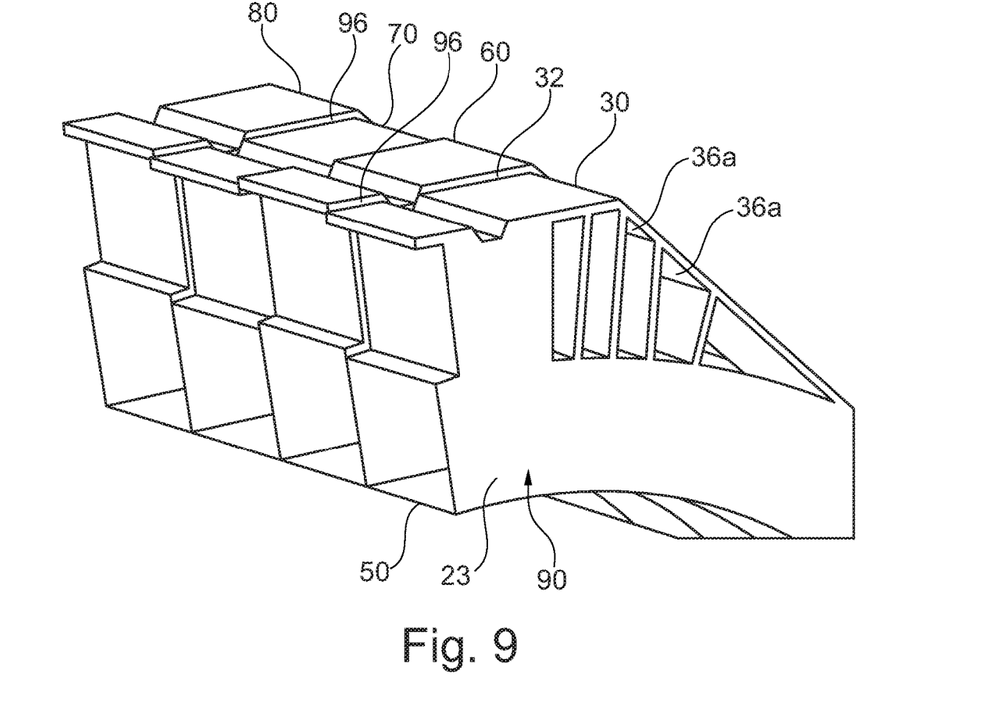
FIG. 9 is a view similar to FIG. 6 of another alternative form of the embodiment.

The alternative form in FIGS. 8 and 9 also corresponds to such an offsetting of the exterior walls 33, and the corresponding discontinuities 96 induced by this offsetting on the exterior surface of the set of stator laminations can be seen in FIG. 9.

In the example of FIGS. 8 and 9, the offset between the partitions 36a and 36b is not as pronounced as it is in the example of FIG. 7, which means that the partitions 36a and 36b are offset but still slightly superposed with one another.

FIG. 8 shows that it is also possible to create a radial offsetting of the radially exterior edge 97 of the annular part at the extensions, from one subset to another, so as to create discontinuities here also.

Thus, in this case, it is possible to find channels for which the four sides delimiting them each exhibit discontinuities at the transition between two consecutive subsets.

FIG. 1 shows that the set of laminations does not have projecting cooling fins that would entail special precautions being taken when handling the stator, unlike certain stators of the prior art, thanks to the closed nature of the channels formed between the partitions 36a and 36b.

However, it would not be departing from the scope of the present invention if certain channels were nonetheless open to the outside.

The machine 1 depicted in FIGS. 10 to 12 comprises the set of laminations 10 according to the invention, to which the front 2 and rear 3 flanges are fixed, by bolting using the through-bolts. The front flange may bear the terminal box 4.

The set of laminations 10 may be covered by a casing 5 which for example is inscribed in the continuity of the exterior surface of a rear cap 6 borne by the rear flange 3. The channels formed between the partitions 36a and 36b open axially to the outside of the machine, along a cylindrical wall 7 of the front flange 2.

The rear cap 6 may house a fan 7 the rotation of which is driven by the shaft 8 of the machine, so that a forced circulation of air passes through the channels during operation of the machine. It is also possible to mount a motor-driven fan unit inside the cap 6 in order to provide cooling across the entire operating range.

In FIG. 12, the rear cap 6 has not been depicted and only the casing 5 covering the set of laminations 10 can be seen. In the alternative form of FIG. 13, the casing 5 is absent, only the rear cap 6 being present.

In the examples of FIGS. 10 to 13, the front and rear flanges are each provided with support feet 28.

Figure 14:
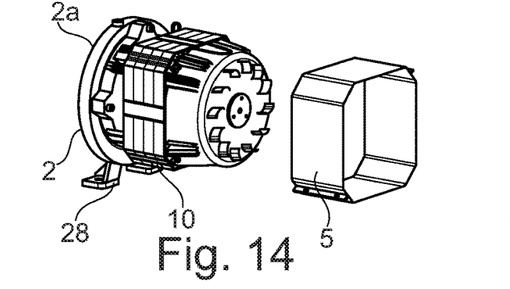
FIGS. 14 and 15 depict another alternative form of the machine, in the process of being assembled.
Figure 15:
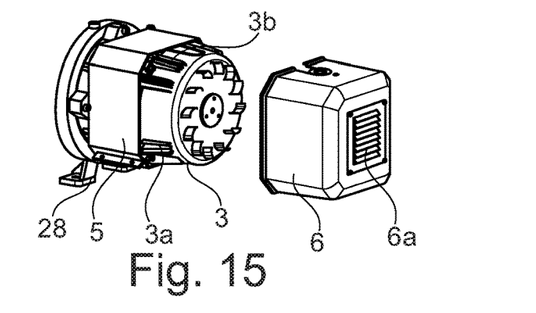

In the alternative form illustrated in FIGS. 14 and 15, the machine is intended to be mounted cantilever-fashion, for example as described in U.S. Pat. No. 7,573,165, and the rear flange 3 no longer comprises the support feet 28. The machine may accept, fixed to the rear flange, a motor-driven fan unit arranged inside a cap 6.

Of course the invention is not restricted to the examples that have just been described.

In particular, the overall shape of the set of laminations may change, and each lamination for example has a hexagonal rather than square shape.

The invention claimed is:

1. Electric machine comprising a stator, wherein this stator comprises a set of magnetic laminations which is made up of at least one first subset and of at least one second subset adjacent to the first, the laminations of the first and second subsets having parts which are superimposed, each comprising at least one closed channel formed within the laminations, these channels communicating with one another at the transition between the subsets, each lamination having angular extensions through which the said channels pass, wherein the parts of the laminations that are superimposed are nonidentical so as to create a perturbation in the flow within the channels at the transition between the channels of the first and second subsets, and wherein the laminations are produced in such a way that, at the transition between two subsets, at least one partition separating two adjacent channels of one subset is nonexactly superimposed with a corresponding partition of the other subset so as to create a discontinuity at the interface between the subsets, in a channel adjacent to the partitions which are superimposed.

2. Machine according to claim 1, wherein the laminations of the subsets are identical but angularly offset from one another from one subset to the other by an angle 360°/n about the axis of the machine, where n is a non-zero integer, the laminations being without symmetry in a rotation by 360°/n so that the parts of the laminations thus offset which are superimposed are nonidentical and create the said perturbation in the flow at the transition between the subsets within the channels.

3. Machine according to claim 1, wherein at least two channels are separated within each angular extension by partitions.

4. Machine according to claim 1, wherein each lamination comprises two exterior walls closing the said channels and offset radially, these walls creating a perturbation in the flow at the transition between the subsets.

5. Machine according to claim 1, wherein each lamination comprises an annular part with two edges of the said part offset radially, these edges creating a perturbation in the flow in the channels at the transition between the two subsets.

6. Machine according to claim 1, wherein the offset between the partitions which creates the discontinuity is at least 1 mm.

7. Machine according to claim 1, wherein at least one of the partitions of a subset is positioned between two partitions of the adjacent subset so that a channel passing through one subset opens into two channels of the adjacent subset.

8. Machine according to claim 1, wherein the laminations has a contour that is generally polygonal.

9. Machine according claim 1, wherein each lamination has n angular extensions, where n is equal to 4.

10. Machine according to claim 1, wherein it comprises an alternation of at least two first subsets and two second subsets.

11. Machine according to claim 10, wherein there is a rotation by 360°/n from one subset to the next along the set of laminations, where n is a non-zero integer.

12. Machine according to claim 1, wherein the laminations comprise at least one external identification slot providing information as to the orientation of each subset within the set.

13. Machine according to claim 1, wherein each subset comprises between 35 and 140 laminations.

14. Machine according to claim 1, wherein the set of laminations comprises holes opening via a passage laterally towards the outside, through-bolts being engaged in these holes and welded to the laminations via the said passages.

15. Machine according to claim 1, being without a casing around the set of laminations.

16. Machine according to claim 1, wherein it comprises a casing at least partially covering the set of laminations.

17. Machine according to claim 1, wherein it is mounted cantilever-fashion on a member that is to be driven or that drives it.

18. Machine according to claim 17, wherein it comprises a front flange adjacent to the member that is to be driven or that drives it, provided with support feet, and a rear flange that has no support feet.

19. Machine according to claim 1, wherein it comprises front and rear flanges each provided with support feet.

20. Electric machine comprising a stator, wherein this stator comprises a set of magnetic laminations which is made up of at least one first subset and of at least one second subset adjacent to the first, the laminations of the first and second subsets having parts which are superimposed, each comprising at least one closed channel formed within the laminations, these channels communicating with one another at the transition between the subsets, wherein the parts of the laminations that are superimposed are nonidentical so as to create a perturbation in the flow within the channels at the transition between the channels of the first and second subsets, wherein the laminations are produced in such a way that, at the transition between two subsets, at least one partition separating two adjacent channels of one subset is nonexactly superimposed with a corresponding partition of the other subset so as to create a discontinuity at the interface between the subsets, in a channel adjacent to the partitions which are superimposed, and wherein at least one of the partitions of a subset is positioned between two partitions of the adjacent subset so that a channel passing through one subset opens into two channels of the adjacent subset.

21. Machine according to claim 20, wherein each lamination has angular extensions through which said channels pass.

* * * * *